United States Patent
Scott-Green et al.

(10) Patent No.: US 11,669,860 B2
(45) Date of Patent: Jun. 6, 2023

(54) METHODS, SYSTEMS, AND MEDIA FOR AUTOMATED COMPLIANCE DETERMINATION OF CONTENT ITEMS

(71) Applicant: Google LLC, Mountain View, CA (US)

(72) Inventors: Henry Scott-Green, Marina Del Rey, CA (US); Michael de Ridder, San Francisco, CA (US); T. J. Gaffney, Mountain View, CA (US); Brian Mulford, Mountain View, CA (US); Amund Tveit, Zurich (CH); Antoine Delaite, Zurich (CH); Preethi Puducheri Sundar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 518 days.

(21) Appl. No.: 16/710,954

(22) Filed: Dec. 11, 2019

(65) Prior Publication Data
US 2021/0182902 A1    Jun. 17, 2021

(51) Int. Cl.
  *G06Q 30/02*      (2023.01)
  *G06Q 30/0241*    (2023.01)
  (Continued)

(52) U.S. Cl.
  CPC ......... *G06Q 30/0248* (2013.01); *G06N 20/00* (2019.01); *G10L 15/22* (2013.01); *G10L 15/26* (2013.01); *G10L 15/30* (2013.01)

(58) Field of Classification Search
  CPC .... G06Q 30/0248; G06N 20/00; G10L 15/22; G10L 15/26; G10L 15/30; G06F 40/20
  See application file for complete search history.

(56) References Cited

U.S. PATENT DOCUMENTS

| 2006/0095262 | A1* | 5/2006 | Danieli | G10L 21/00 704/E21.001 |
| 2008/0313233 | A1* | 12/2008 | Cohen | G11B 27/28 |

(Continued)

OTHER PUBLICATIONS

Illustrated Word2Vec https://jalammar.github.io/illustrated-word2vec/ https://web.archive.org/web/20190327053051/https://jalammar.github.io/illustrated-word2vec/ (Year: 2019).*

(Continued)

*Primary Examiner* — Breffni Baggot
(74) *Attorney, Agent, or Firm* — Byrne Poh LLP

(57) ABSTRACT

Methods, systems, and media for automated compliance determination of content items are provided. In some embodiments, the method comprises: receiving, at a server from a user device associated with a user, a request to provide a branded content item on a media content platform; in response to receiving the request, generating a transcript of a speech portion of the branded content item; generating a plurality of candidate word sequences based on the transcript; selecting a candidate word sequence from the plurality of candidate word sequences based on a similarity that is determined by comparing each of the plurality of candidate word sequences with each of a plurality of target word sequences; in response to selecting the candidate word sequence, applying a model to the selected candidate word sequence to determine whether the selected candidate word sequence contains a first disclosure statement in accordance with one or more disclosure requirements and applying the model to a content description associated with the branded content item to determine whether the content description contains a second disclosure statement in accordance with the one or more disclosure requirements; and associating the branded content item with a compliance indicator that indicates the branded content item is compliant with the one or more disclosure requirements in response to the model (Continued)

indicating that the selected candidate word sequence contains the first disclosure statement and in response to the model indicating that the content description contains the second disclosure statement.

19 Claims, 5 Drawing Sheets

(51) Int. Cl.
    *G06N 20/00*     (2019.01)
    *G10L 15/30*     (2013.01)
    *G10L 15/22*     (2006.01)
    *G10L 15/26*     (2006.01)

(56) References Cited

U.S. PATENT DOCUMENTS

| | | | |
|---|---|---|---|
| 2018/0253661 A1* | 9/2018 | Strauss | G06Q 50/01 |
| 2019/0273767 A1* | 9/2019 | Nelson | H04M 7/0027 |
| 2020/0387937 A1* | 12/2020 | Sheth | G06N 20/00 |
| 2021/0134279 A1* | 5/2021 | Mallenahally | G06F 40/205 |

OTHER PUBLICATIONS

Morchid, M. & Linares, G., "A LDA-Based Method for Automatic Tagging of YouTube Videos", in proceedings of the International Workshop in Image Analysis for Multimedia Interactive Services, Paris, Frace, Jul. 3-5, 2013, pp. 1-4.
Thetalake, "Theta Lake Compliance & Archiving Suite", 2019, pp. 1-3, available at: https://thetalake.com/compliance-and-archiving/.

* cited by examiner

US 11,669,860 B2

METHODS, SYSTEMS, AND MEDIA FOR AUTOMATED COMPLIANCE DETERMINATION OF CONTENT ITEMS

TECHNICAL FIELD

The disclosed subject matter relates to methods, systems, and media for automated compliance determination of content items. More particularly, the disclosed subject matter relates to using a natural language processing model to automatically determine whether a branded content item is compliant with one or more disclosure requirements such that the received branded content item contains a compliant spoken sponsorship disclosure and such that a content description of the received branded content item contains a compliant written sponsorship disclosure.

BACKGROUND

Media content platforms have become the primary mechanism by which users discover and share digital media content. For example, a content creator may upload a video or other content item that the content creator has created to a media content platform, which can then make the uploaded content item available to viewers (e.g., by streaming the content item, by downloading the content item, etc.). In particular, such content can include branded content that includes a video or other content item that the content creator has created but that was funded, sponsored, or produced by a brand advertiser.

Branded content or sponsored content, however, typically comes with compliance requirements from regulators that include the Federal Trade Commission. For example, the Federal Trade Commission requires that an influencer user with a material connection to a brand clearly and conspicuously disclose such a material connection, where a material connection can include a financial (e.g., financial compensation, a free product, a gift, etc.), employment, personal, and/or family relationship with a brand. These compliance requirements can include a specific verbal disclosure that is provided within the first thirty seconds of a video and a written disclosure at the top of the video description. Moreover, in accordance with some compliance requirements, these disclosures must remain with the video in perpetuity.

Media content platforms have responded to these compliance requirements by providing content tools that simply providing tagging features that, for example, include tag applicable business partners in a content item or add standardized text disclosures. Moreover, some media content platforms perform a one-time manual compliance review process that uses human reviewers to manually review a content item and determine whether the content item is compliant with these disclosure requirements. This, however, is time-intensive, laborious, error-prone, requires a costly legal staff, and is challenging as the number of uploaded content items continues to increase. In such cases, a content item may be available on a media content platform for any number of days or weeks before a manual compliance review process indicates that the content item is compliant or non-compliant.

Moreover, there are instances in which a content item is edited by modifying and/or removing disclosures after the manual compliance review process has been performed in which the content item was, at that time, found to be compliant with the disclosure requirements.

Accordingly, it is desirable to provide new methods, systems, and media for automated compliance determination of content items.

SUMMARY

Methods, systems, and media for automated compliance determination of content items are provided.

In accordance with some embodiments of the disclosed subject matter, a computer-implemented method for compliance checking content items is provided, the method comprising: receiving, at a server from a user device associated with a user, a request to provide a branded content item on a media content platform; in response to receiving the request, generating a transcript of a speech portion of the branded content item; generating a plurality of candidate word sequences based on the transcript; selecting a candidate word sequence from the plurality of candidate word sequences based on a similarity that is determined by comparing each of the plurality of candidate word sequences with each of a plurality of target word sequences; in response to selecting the candidate word sequence, applying a model to the selected candidate word sequence to determine whether the selected candidate word sequence contains a first disclosure statement in accordance with one or more disclosure requirements and applying the model to a content description associated with the branded content item to determine whether the content description contains a second disclosure statement in accordance with the one or more disclosure requirements; and associating the branded content item with a compliance indicator that indicates the branded content item is compliant with the one or more disclosure requirements in response to the model indicating that the selected candidate word sequence contains the first disclosure statement and in response to the model indicating that the content description contains the second disclosure statement.

In some embodiments, the transcript of the speech portion of the branded content item is generated by transmitting a content identifier of the branded content item to a speech-to-text converter that converts speech in the branded content item to text in the transcript.

In some embodiments, a time period of the speech portion is selected based on the one or more disclosure requirements requiring that the first disclosure statement is spoken within the time period of the branded content item.

In some embodiments, each of the plurality of candidate word sequences generated from the transcript is a particular length of words.

In some embodiments, the similarity is determined by: generating a plurality of candidate vectors, wherein each of the plurality of candidate word sequences is embedded into a candidate vector; generating a plurality of target vectors, wherein each of the plurality of target word sequences is embedded into a target vector; and comparing each of the plurality of candidate vectors with each of the plurality of target vectors determine a similarity score, wherein the candidate word sequence having a highest similarity score is selected.

In some embodiments, the similarity score is determined by calculating cosine similarity between each of the plurality of candidate vectors and each of the plurality of target vectors.

In some embodiments, in response to the model indicating that the selected candidate word sequence contains the first disclosure statement, the compliance indicator is modified to indicate that the branded content item is non-compliant with the one or more disclosure requirements.

In some embodiments, in response to the model indicating that the content description contains the second disclosure statement, the compliance indicator is modified to indicate that the branded content item is non-compliant with the one or more disclosure requirements.

In some embodiments, in response to determining that none of the plurality of candidate word sequences has a similarity with one of the plurality of target word sequences greater than the similarity threshold value, the compliance indicator is modified to indicate that the branded content item is non-compliant with the one or more disclosure requirements.

In some embodiments, the model is applied to the content description associated with the branded content item to determine whether the content description contains the second disclosure statement in accordance with the one or more disclosure requirements in response to an output of the model determining that the selected candidate word sequence is likely to contain the first disclosure statement in accordance with the one or more disclosure requirements.

In some embodiments, the compliance indicator is set to indicate that the branded content item is compliant with the one or more disclosure requirements in response to determining that an output of the model is greater than a threshold compliance value.

In some embodiments, the method further comprises transmitting the branded content item and the compliance indicator to a reviewing user prior to providing the branded content item on the media content platform.

In some embodiments, the method further comprises determining whether to transmit the branded content item and the compliance indicator to the reviewing user based on a risk tolerance associated with the branded content item.

In some embodiments, the method further comprises determining whether to transmit the branded content item and the compliance indicator to the reviewing user based on a confidence value associated with the compliance indicator.

In some embodiments, the method further comprises allowing the branded content item to be published on the media content platform based on the compliance indicator indicating that the branded content item is compliant with the one or more disclosure requirements.

In some embodiments, the method further comprises inhibiting the branded content item from being published on the media content platform based on the compliance indicator indicating that the branded content item is non-compliant with the one or more disclosure requirements.

In some embodiments, the method further comprises transmitting a notification to the user of the user device that recommends modifications to the branded content item based on the compliance indicator indicating that the branded content item is non-compliant with the one or more disclosure requirements.

In some embodiments, the method further comprises determining that the speech portion of the branded content item is in a first language, wherein the speech portion is translated from the first language to a second language prior to generating the transcript of the speech portion of the branded content item.

In accordance with some embodiments of the disclosed subject matter, a system for compliance checking content items is provided, the system comprising a memory and a hardware processor that, when executing computer executable instructions stored in the memory, is configured to: receive, at a server from a user device associated with a user, a request to provide a branded content item on a media content platform; in response to receiving the request, generate a transcript of a speech portion of the branded content item; generate a plurality of candidate word sequences based on the transcript; select a candidate word sequence from the plurality of candidate word sequences based on a similarity that is determined by comparing each of the plurality of candidate word sequences with each of a plurality of target word sequences; in response to selecting the candidate word sequence, apply a model to the selected candidate word sequence to determine whether the selected candidate word sequence contains a first disclosure statement in accordance with one or more disclosure requirements and applying the model to a content description associated with the branded content item to determine whether the content description contains a second disclosure statement in accordance with the one or more disclosure requirements; and associate the branded content item with a compliance indicator that indicates the branded content item is compliant with the one or more disclosure requirements in response to the model indicating that the selected candidate word sequence contains the first disclosure statement and in response to the model indicating that the content description contains the second disclosure statement.

In accordance with some embodiments of the disclosed subject matter, a non-transitory computer-readable medium containing computer executable instructions that, when executed by a processor, cause the processor to perform a method for compliance checking content items is provided, the method comprising: receiving, at a server from a user device associated with a user, a request to provide a branded content item on a media content platform; in response to receiving the request, generating a transcript of a speech portion of the branded content item; generating a plurality of candidate word sequences based on the transcript; selecting a candidate word sequence from the plurality of candidate word sequences based on a similarity that is determined by comparing each of the plurality of candidate word sequences with each of a plurality of target word sequences; in response to selecting the candidate word sequence, applying a model to the selected candidate word sequence to determine whether the selected candidate word sequence contains a first disclosure statement in accordance with one or more disclosure requirements and applying the model to a content description associated with the branded content item to determine whether the content description contains a second disclosure statement in accordance with the one or more disclosure requirements; and associating the branded content item with a compliance indicator that indicates the branded content item is compliant with the one or more disclosure requirements in response to the model indicating that the selected candidate word sequence contains the first disclosure statement and in response to the model indicating that the content description contains the second disclosure statement.

In accordance with some embodiments of the disclosed subject matter, a system for compliance checking content items is provided, the system comprising: means for receiving, at a server from a user device associated with a user, a request to provide a branded content item on a media content platform; means for generating a transcript of a speech portion of the branded content item in response to receiving the request; means for generating a plurality of candidate word sequences based on the transcript; means for selecting a candidate word sequence from the plurality of candidate word sequences based on a similarity that is determined by comparing each of the plurality of candidate word sequences with each of a plurality of target word sequences; means for applying a model to the selected candidate word sequence to determine whether the selected candidate word sequence contains a first disclosure statement in accordance with one or more disclosure requirements and applying the model to a content description associated with the branded content item to determine whether the content description contains a second disclosure statement in accordance with the one or more disclosure requirements in response to selecting the candidate word sequence; and means for associating the branded content item with a compliance indicator that indicates the branded content item is compliant with the one or more disclosure requirements in response to the model indicating that the selected candidate word sequence contains the first disclosure statement and in response to the model indicating that the content description contains the second disclosure statement.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
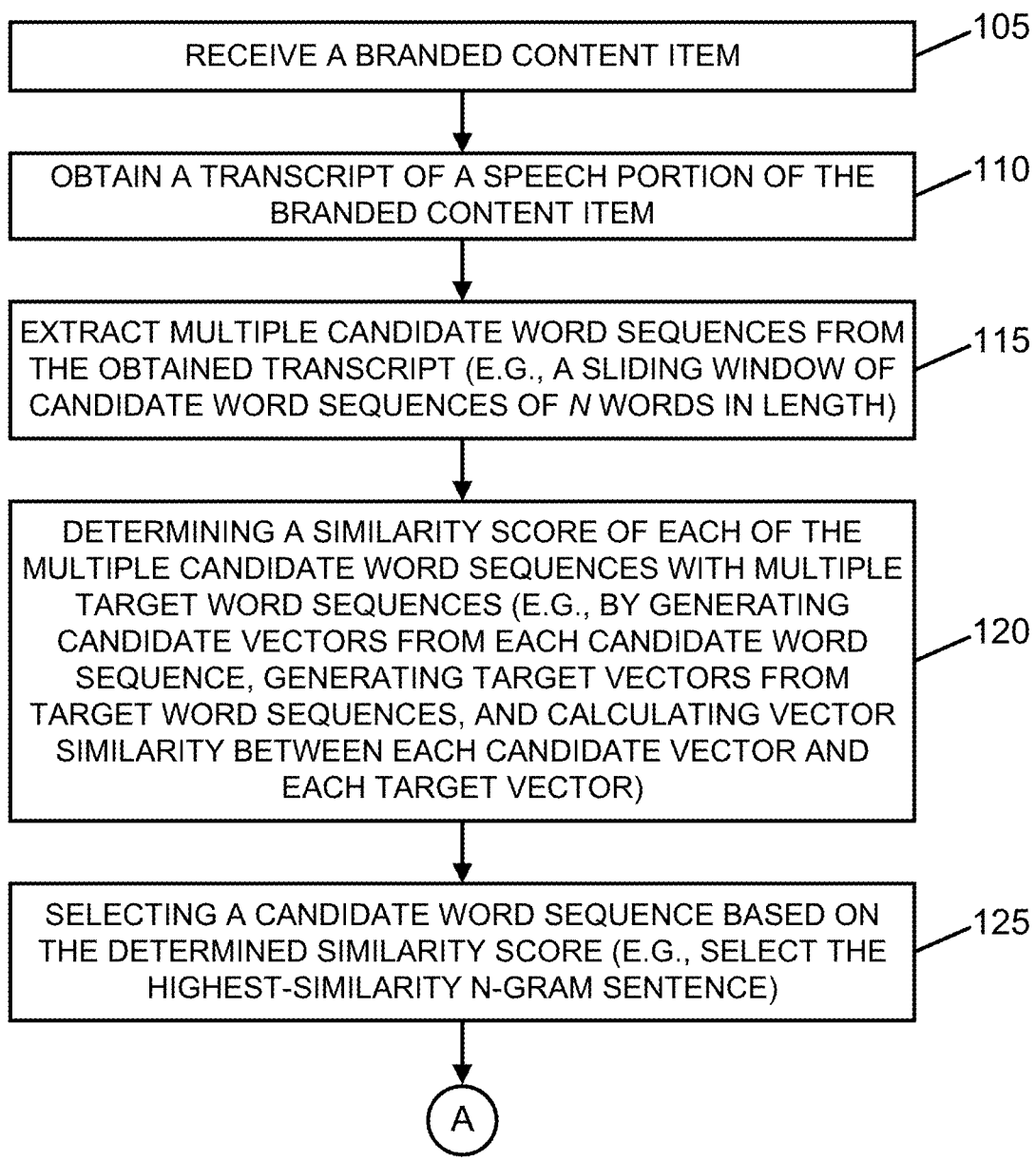
FIG. 1A shows an illustrative example of a process for automated compliance determination of branded content items in which a candidate word sequence is selected based on similarity to a target word sequence in accordance with some embodiments of the disclosed subject matter.

In accordance with various embodiments, mechanisms (which can include methods, systems, and media) for automated compliance verification of content items are provided. More particularly, the mechanisms relate to using a natural language processing model to automatically determine whether a received content item is compliant with a disclosure requirement such that the received content item contains a compliant spoken sponsorship disclosure and/or such that a description of the received content item contains a compliant written sponsorship disclosure.

Prior content tools typically allow branded content items to be published or otherwise made available prior to such content being reviewed, which introduces a great amount of risk. Other prior content tools may perform a manual compliance review process of branded content items that is time-intensive, laborious, and error-prone. The mechanisms described herein can automatically provide a compliance indicator as to whether a branded content item is compliant with one or more disclosure requirements without requiring human review of each piece of branded content.

In some embodiments, the mechanisms can begin by receiving a request to provide a branded content item on a media content platform. For example, the mechanisms can receive a request to upload a video content item for providing on the media content platform, where the video content item is associated with one or more indicators indicating that the content contained in the video content item has a material connection with a brand. Additionally or alternatively, in another example, the mechanisms can be associated with a marketing platform that connects content creators with brands, where the marketing platform can allow a content creator to submit a creative proposal for a sponsorship and can allow the content creator to generate endorsed content. In continuing this example, prior to making the endorsed content available on a media content platform and/or prior to sharing the endorsed content to a brand for final approval, the mechanisms can receive a video identifier associated with the content item along with an indication of a brand associated with the content item.

In some embodiments, the mechanisms can, upon receiving a branded content item, automatically generate a compliance indicator indicating whether the branded content item is compliant or non-compliant with one or more disclosure requirements. For example, the mechanisms can use a natural language processing model to select a candidate word sequence from multiple candidate word sequences and can apply a machine learning classifier to the selected candidate word sequence to output a compliance score. In continuing this example, in response to determining that the compliance score is greater than a particular threshold value, the compliance indicator associated with the branded content item can be set to indicate that the branded content item is compliant with one or more disclosure requirements. Otherwise, in response to determining that the compliance score is less than a particular threshold value, the compliance indicator associated with the branded content item can be set to indicate that the branded content item is non-compliant with one or more disclosure requirements.

In some embodiments, the mechanisms can use a natural language processing approach that includes obtaining a transcript of a speech portion of the branded content item and extracting multiple candidate word sequences from the obtained transcript (e.g., candidate word sequences of N words in length). The mechanisms can then determine whether one of the candidate word sequences is similar to one of multiple target word sequences. The mechanisms can select the candidate word sequence that is most similar to one of the target word sequences and apply a machine learning classifier to determine whether the candidate word sequence includes a compliant verbal disclosure statement. It should be noted that, in some embodiments, in response to determining that none of the candidate word sequences have a similarity that is greater than a threshold similarity value, the mechanisms can set the compliance indicator to indicate that the branded content item is non-compliant with one or more disclosure requirements.

Additionally, in some embodiments, the mechanisms can also determine whether a content description associated with the branded content item contains a compliant written disclosure. For example, the mechanisms can retrieve a content description associated with the branded content item and use a machine learning classifier to determine whether the content description contains a compliant written disclosure. In another example, the mechanisms can retrieve page information as to how the content description is presented to a viewer to determine whether the page information indicates that the written disclosure is clearly and/or conspicuously presented to the viewer (e.g., the written disclosure appears above-the-fold without expanding the content description, the written disclosure appears in a particular font or a particular color in a page having a particular background color). In continuing this example, in response to determining that the written disclosure is compliant with one or more disclosure requirements, the mechanisms can continue to indicate that the branded content item is compliant with one or more disclosure requirements. Otherwise, in response to determining that the written disclosure is non-compliant with one or more disclosure requirements, the mechanisms can modify the compliance indicator to indicate that the branded content item is non-compliant with one or more disclosure requirements.

In some embodiments, the mechanisms can cause the branded content item to be published or otherwise provided on the media content platform in response to the compliance indicator indicating that the branded content item is compliant with one or more disclosure requirements. In some embodiments, the mechanisms can cause the branded content item to be inhibited from being provided on the media content platform. For example, the content creator of the branded content item can receive an indication that edits to the branded content item are needed with regard to at least one of the disclosure requirements.

Additionally or alternatively, the mechanisms can transmit the compliance indicator to be reviewed by a reviewer (e.g., a reviewing user at a suitable computing device). For example, the mechanisms can insert branded content items having a compliance indicator that indicates that the branded content item is compliant with one or more disclosure requirements and having a risk tolerance greater than a particular risk threshold value into a queue to be reviewed by a reviewer. In continuing this example, the reviewer can determine whether the branded content item includes the verbal disclosure statement in accordance with one or more disclosure requirements and can determine whether the content description of the branded content item includes the written disclosure statement in accordance with one or more disclosure requirements. In a more particular example, the reviewer can receive any suitable information, such as a content identifier, a value of an associated compliance indicator, information relating to the content creator of the branded content item, information relating to a brand associated with the branded content item, the one or more disclosure requirements that are applicable to the branded content item, etc.

It should be noted that, in some embodiments, the generated compliance indicator can eliminate the above-mentioned manual review of branded content items by reviewers. For example, the mechanisms can bypass review of the branded content item by a reviewer in response to receiving a compliance indicator that indicates the branded content item is compliant with one or more disclosure requirements and in response to determining that the risk value associated with the branded content item is associated with a low risk. In another example, the mechanisms can bypass review of the branded content item by a reviewer in response to receiving a compliance indicator that indicates the branded content item is compliant with one or more disclosure requirements and in response to determining that the media content platform has a relatively high risk tolerance level. In yet another example, the mechanisms can bypass review of the branded content item by a reviewer in response to receiving a compliance indicator that indicates the branded content item is compliant with one or more disclosure requirements and in response to determining that a confidence value associated with the compliance indicator is higher than a threshold confidence value.

These and other features for automated compliance determinations of content items are further described in connection with FIGS. 1A-4.

Turning to FIG. 1A, an illustrative example of a process 100 for automated compliance determination of branded content items in which a candidate word sequence is selected based on similarity to a target word sequence in accordance with some embodiments of the disclosed subject matter. In some embodiments, blocks of process 100 can be executed on a server, such as a server associated with a video sharing service that hosts content items uploaded by one or more content creators or a server associated with a marketing platform service that connects one or more content creators and the content items created by the content creators with brands and brand advertisers.

Process 100 can begin at 105 by receiving, from a content creator, a branded content item to be uploaded or posted in connection with a video sharing service. For example, in some embodiments, the branded content item can be a video content item or an audio content item created by the content creator that is to be uploaded to the video sharing service and made available for viewing by other users of the video sharing service, where the content item is associated with one or more indicators indicating that the content contained in the content item has a material connection with a brand. In a more particular example, the branded content item can indicate that the content contained in the branded content item was funded, sponsored, or produced by a brand advertiser.

Additionally or alternatively, in another example, the branded content item can be associated with a marketing platform that connects content creators with brands. In continuing this example, the marketing platform can allow a content creator to submit a creative proposal for a sponsorship and can allow the content creator to generate endorsed content. The generated content for the brand can be received for automated compliance determination prior to making the endorsed content available (e.g., for review by a brand advertiser).

It should be noted that the branded content item can include any suitable type of content, such as a video, a playlist of videos, a link to a live stream of a video, an image, an animation, a photo, a slideshow of photos, a document, and/or any other suitable type of content.

It should also be noted that, although the embodiments described herein generally relate to automated compliance determination for a branded content item received from a content creator, this is merely illustrative. For example, in some embodiments, while process 100 can be executed on every inbound branded content item to perform the automated compliance determination prior to the branded content item being posted or otherwise made available on a media content platform, process 100 can also be executed on one or more branded content items at a particular frequency (e.g., once per day, once per week, etc.). This can, for example, ensure that a branded content item having a compliance indicator indicating that the branded content item is compliant with one or more disclosure requirements (e.g., for including a compliant spoken sponsorship disclosure, for including a compliant written sponsorship disclosure, etc.) remains compliant (e.g., that the compliant disclosures remain in place). In continuing this example, a notification or alert can be generated in response to determining that a once-compliant branded content item is no longer compliant with the one or more disclosure requirements and a follow-up request with the content creator can be transmitted.

In some embodiments, at 110, process 100 can obtain a transcript of a speech portion of the branded content item. For example, in some embodiments, process 100 can transmit a content identifier or the branded content item itself to a speech-to-text converter that is configured to convert the speech contained in a particular portion of the branded content item to text (e.g., a text transcript of the first thirty seconds of the branded content item, the first minute of the branded content item, etc.). In a more particular example, the speech-to-text converter can generate captions transcribing the audio portion of the branded content item into a readable transcript. In another example, in some embodiments, process 100 can obtain a text transcript of the entire audio portion of the branded content item and extract a portion of the text transcript for further analysis (e.g., a text transcript of the first thirty seconds of the branded content item, the first minute of the branded content item, etc.).

Figure 2:
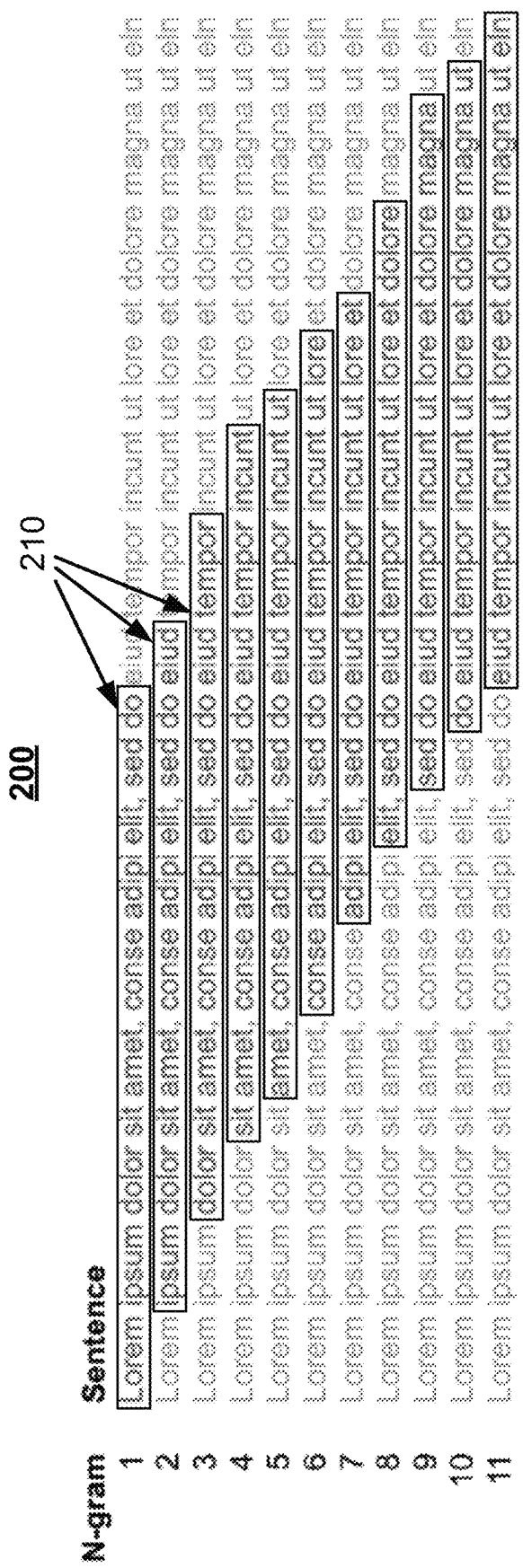
FIG. 2 shows an illustrative example of extracting multiple candidate word sequences (e.g., candidate word sequences of N words in length) from a text transcript of a speech portion of the branded content item in accordance with some embodiments of the disclosed subject matter.

In some embodiments, at 115, process 100 can extract multiple candidate word sequences based on the transcript. For example, a text transcript of the first minute of audio in the branded content item can be divided into multiple sequences, where each sequence includes N number of words (which is sometimes referred to herein as an "n-gram candidate sentence" or an "n-gram candidate word sequence"). As shown in FIG. 2, process 100 can generate a word sequence 210 or a sentence having N number of words and then advance word-by-word to generate multiple word sequences 210 that each have N number of words. In particular, FIG. 2 shows that a first word sequence can be the ten-word sentence of "Lorem ipsum dolor sit amet, conse adipi elit, sed do" and a second word sequence can be the ten-word sentence of "ipsum dolor sit amet, conse adipi elit, sed do eiud." Based on approximately 150 words per minute of spoken English, process 100 can generate about 132 n-gram candidate word sequences per minute of video. The use of multiple n-gram candidate sentences can, for example, allow process 100 to compare each possible phrase of spoken text.

It should be noted that any suitable number of words can be used in extracting candidate word sequences. For example, in some embodiments, the number of words in a word sequence can be based on the type of content. In another example, in some embodiments, the number of words in a word sequence can be based on the language associated with the spoken text of the branded content item. In yet another example, in some embodiments, the number of words in a word sequence can be based on an average length of verbal disclosures that were previously deemed as being compliant with the disclosure requirements.

Referring back to FIG. 1A, in some embodiments, process 100 can determine whether one of the candidate word sequences is similar to one of a set of target word sequences at 120. Illustrative examples of target word sequences can include:

"This video was sponsored by [BRAND]."
"Thanks to [BRAND] for sponsoring this video."
"This is an ad for [BRAND]."
"I worked with [BRAND] to make this video."
"[BRAND] paid me to make this video."
"Hey guys, this is an ad for [BRAND]."
"[BRAND] paid for this part of the video."
"I worked with [BRAND] to make this part of the video."
"I worked with [COMPANY] to tell you about some of their great products."
"I worked with [COMPANY] on this video so I can tell you about their great brands."
"This post was sponsored by [BRAND]."
"Thanks to [BRAND] for sponsoring this video."
"This is an ad for [BRAND]."
"Check out my new sponsored video about [BRAND]."

In some embodiments, process 100 can embed each target word sequence to generate a target vector and can embed each candidate word sequence to generate a candidate vector. Process 100 can then compare each of the candidate vectors against each of the target vectors using a vector similarity algorithm. For example, process 100 can embed each candidate word sequence that was extracted from a text transcript from FIG. 2 to a set of candidate vectors and can embed each of the above-mentioned target sentences into a set of target vectors. In a more particular example, a word embedding of each candidate word sequence or target sentence can be generated using a model, such as Word2vec or Universal Sentence Encoder. A cosine similarity calculation can be performed between each of the candidate vectors and each of the target vectors.

It should be noted that any suitable word representation can be used to represent the multiple candidate word sequences and the multiple target word sequences for comparison.

Using this vector similarity algorithm, process 100 can determine a similarity score, such as a cosine similarity score, between each of the candidate vectors and each of the target vectors.

In some embodiments, at 125, process 100 can select a candidate word sequence based on the determined similarity score. For example, process 100 can determine which of the candidate vectors has the highest similarity score with at least one of the target vectors and can select the candidate word sequence corresponding to the candidate vector having the highest similarity score. In a more particular example, process 100 can select the n-gram sentence having the highest cosine similarity to the target vectors (e.g., "This episode is sponsored by [BRAND]"). It should be noted that, in some embodiments, process 100 can select multiple candidate word sequences having a similarity score greater than a particular similarity threshold value. It should be noted that, in some embodiments, only one candidate sentence or candidate word sequence of N words having the highest similarity score can be selected.

Figure 1B:
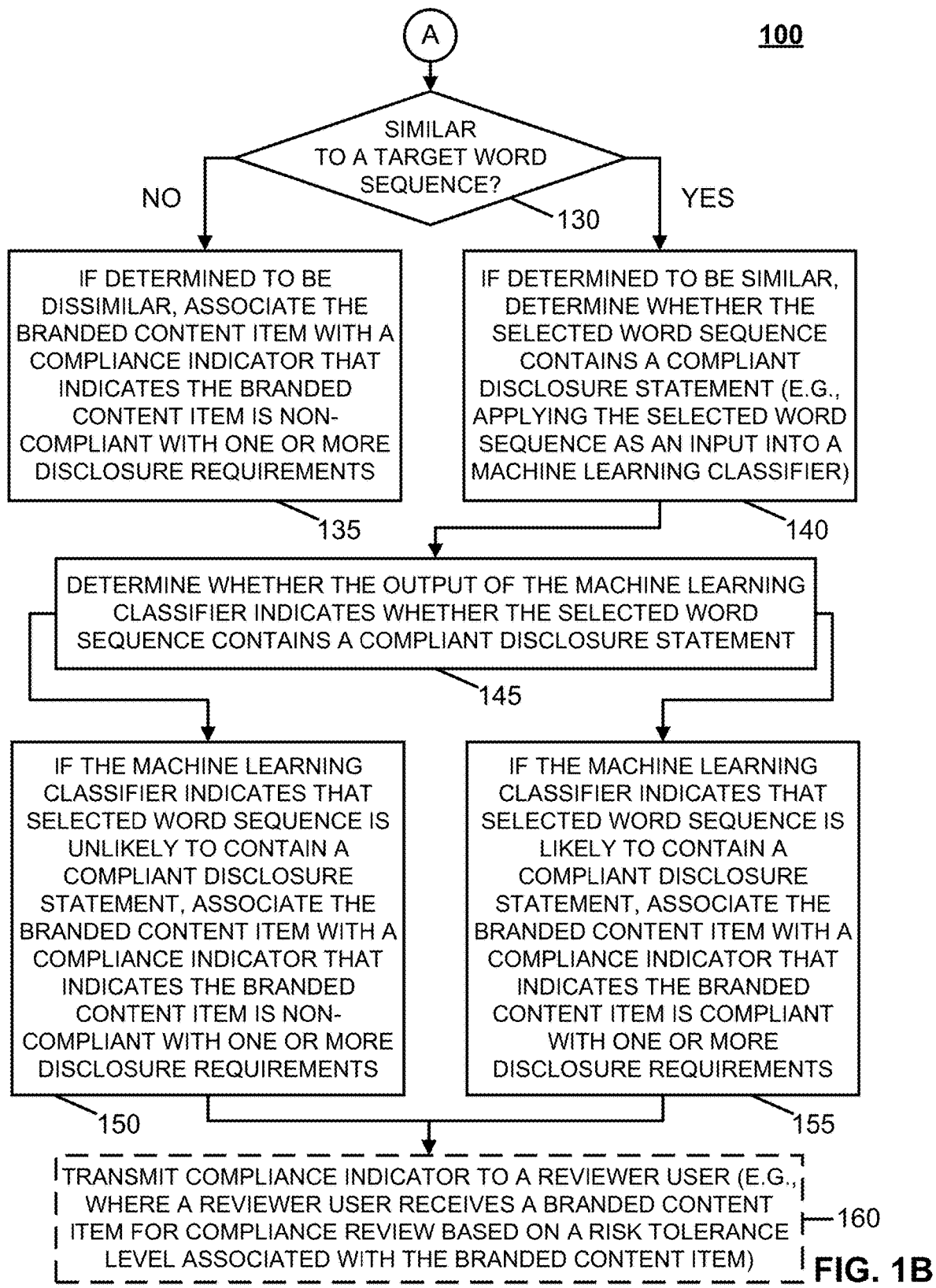
FIG. 1B shows an illustrative example of a process for automated compliance determination of branded content items in which a compliance indicator is set based on a model and in which the compliance indicator can be used to perform an action on a branded content item in accordance with some embodiments of the disclosed subject matter.

Referring to FIG. 1B, in some embodiments, process 100 can filter candidate word sequences that do not meet a particular similarity threshold value at 130. For example, in response to determining that the selected candidate word sequence has a similarity score that is less than the similarity threshold value (e.g., "NO" at 130), process 100 can associate the branded content item with a compliance indicator that indicates that the branded content item is non-compliant with one or more disclosure requirements at 135. In a more particular example, the candidate word sequence having the highest similarity score to the set of target vectors is deemed to be dissimilar from the set of target vectors for not meeting the threshold of cosine similarity. Accordingly, a compliance indicator associated with the branded content item is set as being non-compliant with one or more disclosure requirements.

Alternatively, in response to determining that the selected candidate word sequence has a similarity score that is greater than the similarity threshold value (e.g., "YES" at 130), process 100 can proceed to determine whether the selected word sequence contains a compliant disclosure statement at 140. For example, process 100 can apply a machine learning classifier over the highest-similarity n-gram sentence selected at step 125. In a more particular example, process 100 can provide the selected candidate word sequence as an input into the machine learning classifier to determine whether the selected candidate word sequence is likely to contain a compliant spoken sponsorship disclosure (e.g., within a time window of the branded content item). In some embodiments, the machine learning classifier can output a probability score or any other suitable output score that indicates a likelihood that the selected candidate word sequence contains a compliant spoken sponsorship disclosure.

It should be noted that the machine learning classifier can be trained using a corpus of branded content items that are known to contain disclosures that are compliant with one or more disclosure requirements. It should also be noted that the machine learning classifier can be trained with negative examples of disclosures within previously provided content items that are non-compliant with the one or more disclosure requirements.

In response to determining that the selected candidate word sequence is unlikely to contain a compliant spoken sponsorship disclosure ("NO" at 145), process 100 can associate the branded content item with a compliance indicator that indicates that the branded content item is non-compliant with one or more disclosure requirements at 150. In a more particular example, the candidate word sequence having the highest similarity score to the set of target vectors is deemed to be dissimilar from the set of target vectors for not meeting the threshold of cosine similarity. Accordingly, a compliance indicator associated with the branded content item is set as being non-compliant with one or more disclosure requirements.

Alternatively, in some embodiments, in response to determining that the selected candidate word sequence is unlikely to contain a compliant spoken sponsorship disclosure, process 100 can return to 110 of FIG. 1A and obtain a text transcript of a different audio portion of the branded content item to, for example, determine whether a compliant spoken sponsorship disclosure was provided within a different time period than the first time period from the start of the branded content item (e.g., a time period of third seconds from the start of the branded content item to sixty seconds). Using a text transcript of this different time period, process 100 can proceed through steps 115 through 145 to determine whether a compliant spoken sponsorship disclosure was provided during this different time period. In some instances, a spoken sponsorship disclosure that was made within a particular time period (e.g., within a time window of 30 seconds to 60 seconds from the start of the branded content item) can be considered to be compliant with one or more disclosure requirements.

Alternatively, in response to determining that the selected candidate word sequence is likely to contain a compliant spoken sponsorship disclosure ("YES" at 145), process 100 can proceed with the automated compliance determination.

For example, in some embodiments, in response to determining that the selected candidate word sequence is likely to contain a compliant spoken sponsorship disclosure, process 100 can also retrieve a content description associated with the branded content item and determine whether the content description contains a compliant written disclosure. In a more particular example, process 100 can determine whether the content description provides a written disclosure within a particular portion of the branded content item— e.g., the written disclosure appears above-the-fold without expanding the content description, the written disclosure appears in a particular font or a particular color on a page having a particular background color, etc. That is, process 100 can determine whether the content description contains a written disclosure statement that is clearly and conspicuously presented to a viewer of the branded content item.

In another example, in some embodiments, in response to determining that the selected candidate word sequence is likely to contain a compliant spoken sponsorship disclosure, process 100 can analyze a page that presents the branded content item to determine whether a written disclosure is clearly and conspicuously displayed on the page. For example, process 100 can determine whether a written sponsorship disclosure is presented with the branded content item and, if so, whether the written sponsorship disclosure is presented at a particular portion of the page that presents the branded content item.

Referring back to FIG. 1B, process 100 can interpret the output of the machine learning classifier. For example, the output of the machine learning classifier can be a probability that the branded content item includes a compliant spoken sponsorship disclosure. In another example, the output of the machine learning classifier can include a combination of multiple probabilities, such as a probability that the branded content item includes a compliant spoken sponsorship disclosure, a probability that the spoken sponsorship disclosure is provided within a particular time period from the start of the branded content item, a probability that the branded content item has a content description that contains a written sponsorship disclosure, a probability that the written sponsorship disclosure appears in a clear and conspicuous manner on a page that presents the branded content item, etc.

In some embodiments, in continuing the example above, in response to determining that a model output of the machine learning classifier is less than a particular threshold value ("NO" at 145), process 100 can associate the branded content item with a compliance indicator that indicates the branded content item is non-compliant with one or more disclosure requirements at 150. Alternatively, in response to determining that a model output of the machine learning classifier is greater than a particular threshold value ("YES" at 145), process 100 can associate the branded content item with a compliance indicator that indicates the branded content item is compliant with one or more disclosure requirements at 150.

In some embodiments, process 100 can use the compliance indicator associated with the branded content item to perform one or more actions on the branded content item.

For example, in some embodiments, process 100 can automatically cause the branded content item to be published or otherwise provided on the media content platform in response to the compliance indicator indicating that the branded content item is compliant with one or more disclosure requirements. In a more particular example, process 100 can determine a risk tolerance associated with the media content platform in publishing the branded content item and, based on the risk tolerance, can automatically publish the branded content item on the media content platform in response to the compliance indicator indicating that the branded content item is compliant with one or more disclosure requirements.

In another example, in some embodiments, process 100 can automatically inhibit the branded content item from being published or otherwise provided on the media content platform in response to the compliance indicator indicating that the branded content item is not compliant with one or more disclosure requirements. In a more particular example, process 100 can determine a risk tolerance associated with the media content platform in publishing the branded content item and, based on the risk tolerance, can automatically inhibit the branded content item from being published on the media content platform in response to the compliance indicator indicating that the branded content item is not compliant with one or more disclosure requirements. Note that, in instances where the branded content item is a live-stream of content, process 100 can stop or inhibit the live-stream from being streamed to any user devices.

In yet another example, in some embodiments, process 100 can provide one or more edit recommendations to a content creator in response to the compliance indicator indicating that the branded content item is not compliant with one or more disclosure requirements. In a more particular example, process 100 can transmit a notification to a content creator of the branded content item to indicate that the branded content item is not compliant with one or more disclosure requirements. In continuing this example, the notification can indicate one or more edits to the disclosure statements contained in the branded content item, such as the spoken sponsorship disclosure does not have the correct format, the spoken sponsorship disclosure is not provided within the first thirty seconds of the branded content item, the written sponsorship disclosure does not appear in the content description without expanding the content description on a content page, etc. In another more particular example, process 100 can generate a user interface that indicates the branded content item has not been accepted by the media content platform for publishing and indicates that the content creator is required to edit the branded content item prior to re-submitting the branded content item for approval.

In a further example, in some embodiments, process 100 can request that the branded content item is manually reviewed. For example, as shown at 160 of FIG. 1, process 100 can transmit the compliance indicator to be reviewed by a reviewer (e.g., a reviewing user at a suitable computing device). In a more particular example, process 100 can receive a model output from the machine learning classifier that determines whether particular disclosures were provided in the branded content item and a confidence value that corresponds with the compliance indicator. In continuing this example, in response to the confidence value falling below a particular confidence threshold value (e.g., borderline or low confidence compliance determinations), process 100 can flag the branded content item and its compliance indicator for review by a reviewing user. It should be noted that the reviewing user can receive any suitable information corresponding to the branded content item, such as a content identifier, a value of an associated compliance indicator, information relating to the content creator of the branded content item, information relating to a brand associated with the branded content item, the one or more disclosure requirements that are applicable to the branded content item, etc.

It should be noted that, in some embodiments, the branded content item and its compliance indicator (e.g., whether indicating that the branded content item is compliant or non-compliant) can be transmitted to a reviewing user based on a risk tolerance of the media content platform in publishing the branded content item. For example, in response to determining that the branded content item is a particular content type, process 100 can insert the branded content item into a queue of content items of a reviewing user.

In continuing this example, the reviewing user can determine whether the branded content item includes the verbal disclosure statement in accordance with one or more disclosure requirements and can determine whether the content description of the branded content item includes the written disclosure statement in accordance with one or more disclosure requirements. Additionally, in some embodiments, the reviewing user can provide comments and other suitable information relating to the determination as to whether the branded content item includes the verbal disclosure statement in accordance with one or more disclosure requirements and/or whether the content description of the branded content item includes the written disclosure statement in accordance with one or more disclosure requirements.

It should be noted that, in some embodiments, the generated compliance indicator can eliminate the above-mentioned manual review of branded content items by reviewers. For example, the manual review by a reviewer can be bypassed in response to receiving a compliance indicator that indicates the branded content item is compliant with one or more disclosure requirements and in response to determining that the risk value associated with the branded content item is associated with a low risk. In another example, the manual review by a reviewer can be bypassed in response to receiving a compliance indicator that indicates the branded content item is compliant with one or more disclosure requirements and in response to determining that the media content platform has a relatively high risk tolerance level. In yet another example, the manual review by a reviewer can be bypassed in response to receiving a compliance indicator that indicates the branded content item is compliant with one or more disclosure requirements and in response to determining that a confidence value associated with the compliance indicator is higher than a threshold confidence value.

Figure 3:
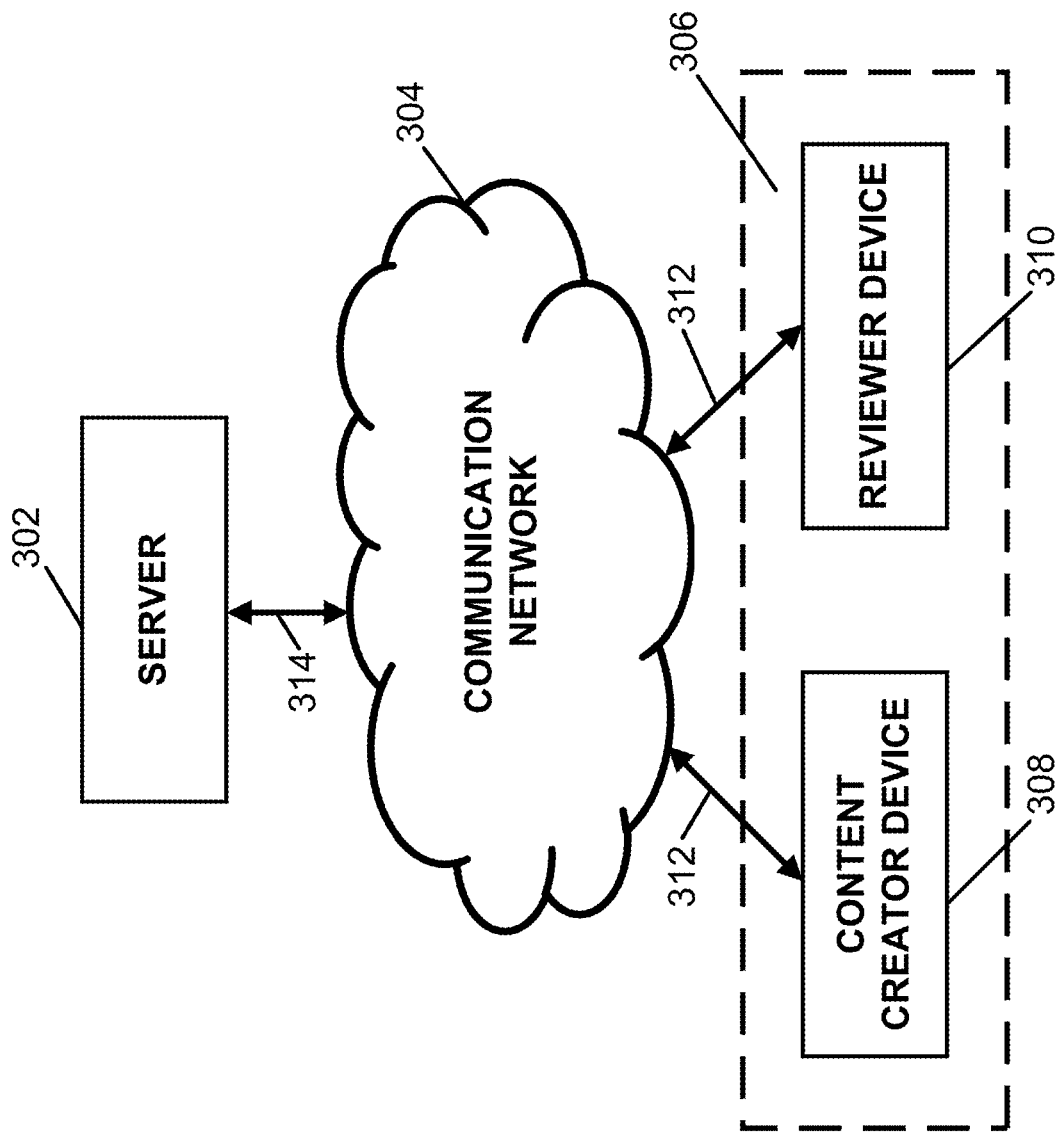
FIG. 3 shows a schematic diagram of an illustrative system suitable for implementation of mechanisms described herein for automated compliance determination of branded content items in accordance with some embodiments of the disclosed subject matter.
Figure 4:
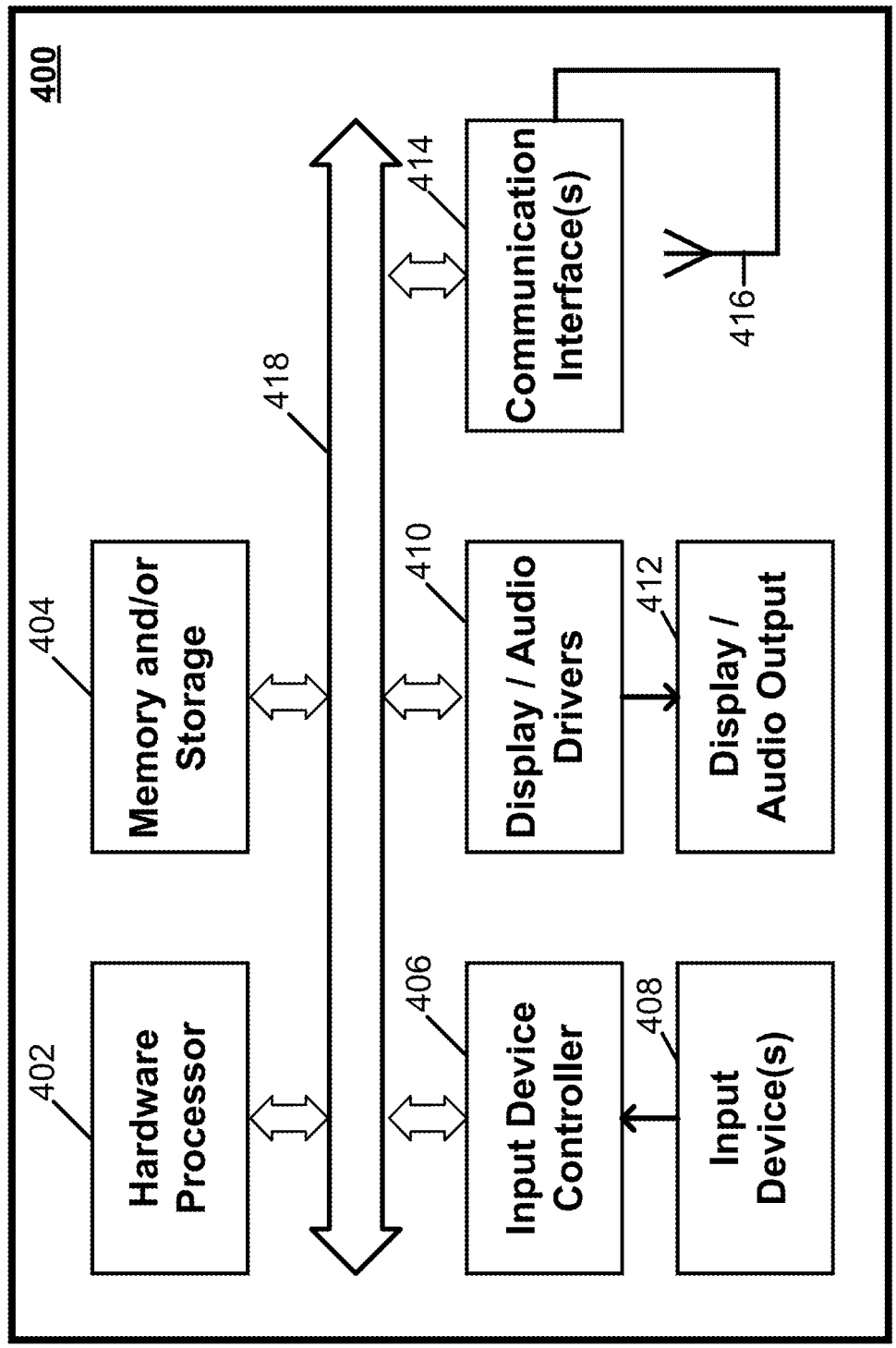
FIG. 4 shows a detailed example of hardware that can be used in a server and/or a user device of FIG. 3 in accordance with some embodiments of the disclosed subject matter.

Turning to FIG. 3, an illustrative example 300 of hardware for automated compliance determination that can be used in accordance with some embodiments of the disclosed subject matter is shown. As illustrated, hardware 300 can include a server 302, a communication network 304, and/or one or more user devices 306, such as a content creator device 308 and/or a reviewer device 310.

Server 302 can be any suitable server(s) for storing information, data, media content, and/or any other suitable type of content. For example, in some embodiments, server 302 can store user-generated media content, such as branded content items, uploaded by one or more content creator device 308. As a more particular example, in some embodiments, the user-generated media content can include videos, movies, photos, slideshows, animations, documents, and/or any other suitable user-generated media content. As another example, in some embodiments, server 302 can store information about one or more content creators that have uploaded user-generated content to server 302, such as whether a particular content creator has previously uploaded content that violates a particular policy of a video sharing service, and/or any other suitable information. In some embodiments, server 302 can implement any suitable processes for queuing branded content items for review, storing a decision related to a branded content item (e.g., a decision indicating whether or not the branded content item contains compliant disclosure statements, and/or any other suitable decision), and/or performing any other suitable functions. For example, in some embodiments, server 302 can implement any suitable blocks of process 100, as shown in and described above in connection with FIGS. 1A and 1B.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices. For example, in some embodiments, user devices 306 can include content creator device 308. In some embodiments, content creator device 308 can be any user device suitable for capturing user-generated content, uploading user-generated content, receiving notifications indicating compliance decisions related to an uploaded content item, and/or for performing any other suitable functions. As another example, in some embodiments, user devices 306 can include reviewer device 310. In some embodiments, reviewer device 310 can be any user device suitable for viewing an uploaded content item, transmitting a compliance decision related to the uploaded content item, and/or performing any other suitable function(s). In some embodiments, user devices 306 can include any suitable types of user devices. For example, in some embodiments, user devices 306 can include a mobile phone, a wearable computer, a tablet computer, a desktop computer, a laptop computer, a vehicle entertainment system, a game console, a television, and/or any other suitable user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Server 302 and user devices 306 can be implemented using any suitable hardware in some embodiments. For example, in some embodiments, devices 302 and 306 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage 404 of user device 306.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for automated compliance determination of content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A computer-implemented method for compliance checking content items, the method comprising:
    receiving, at a server that includes a hardware processor, from a user device associated with a user, a request to provide a branded content item on a media content platform;
    in response to receiving the request, transcribing, using the hardware processor, an audio portion of the branded content item into a transcript of a speech portion of the branded content item;
    dividing, using the hardware processor, the transcript of the speech portion of the branded content item into a plurality of candidate word sequences having a particular number of words, wherein the plurality of candidate word sequences are obtained by advancing word-by-word in the transcript;
    selecting, using the hardware processor, a candidate word sequence from the plurality of candidate word sequences based on a similarity that is determined by comparing each of the plurality of candidate word sequences with each of a plurality of target word sequences;
    in response to selecting the candidate word sequence, applying, using the hardware processor, a natural language processing model to the selected candidate word sequence to determine whether the selected candidate word sequence contains a first disclosure statement in accordance with one or more disclosure requirements and applying, using the hardware processor, the natural language processing model to a content description associated with the branded content item to determine whether the content description contains a second disclosure statement in accordance with the one or more disclosure requirements;
    associating the branded content item with a compliance indicator that indicates the branded content item is compliant with the one or more disclosure requirements in response to the natural language processing model indicating that the selected candidate word sequence contains the first disclosure statement and in response to the natural language processing model indicating that the content description contains the second disclosure statement; and
    automatically causing the branded content item to be published on the media content platform based on the compliance indicator indicating that the branded content item is compliant with the one or more disclosure requirements.

2. The computer-implemented method of claim 1, wherein the transcript of the speech portion of the branded content item is generated by transmitting a content identifier of the branded content item to a speech-to-text converter that converts speech in the branded content item to text in the transcript.

3. The computer-implemented method of claim 1, wherein a time period of the speech portion is selected based on the one or more disclosure requirements requiring that the first disclosure statement is spoken within the time period of the branded content item.

4. The computer-implemented method of claim 1, wherein each of the plurality of candidate word sequences generated from the transcript is a particular length of words.

5. The computer-implemented method of claim 1, wherein the similarity is determined by:
    generating a plurality of candidate vectors, wherein each of the plurality of candidate word sequences is embedded into a candidate vector;
    generating a plurality of target vectors, wherein each of the plurality of target word sequences is embedded into a target vector; and
    comparing each of the plurality of candidate vectors with each of the plurality of target vectors determine a similarity score, wherein the candidate word sequence having a highest similarity score is selected.

6. The computer-implemented method of claim 5, wherein the similarity score is determined by calculating cosine similarity between each of the plurality of candidate vectors and each of the plurality of target vectors.

7. The computer-implemented method of claim 1, wherein, in response to the natural language processing model indicating that the selected candidate word sequence does not contain the first disclosure statement, the compliance indicator is modified to indicate that the branded content item is non-compliant with the one or more disclosure requirements.

8. The computer-implemented method of claim 1, wherein, in response to the natural language processing model indicating that the content description does not contain the second disclosure statement, the compliance indicator is modified to indicate that the branded content item is non-compliant with the one or more disclosure requirements.

9. The computer-implemented method of claim 1, wherein, in response to determining that none of the plurality of candidate word sequences has a similarity with one of the plurality of target word sequences greater than the similarity threshold value, the compliance indicator is modified to indicate that the branded content item is non-compliant with the one or more disclosure requirements.

10. The computer-implemented method of claim 1, wherein the natural language processing model is applied to the content description associated with the branded content item to determine whether the content description contains the second disclosure statement in accordance with the one or more disclosure requirements in response to an output of the natural language processing model determining that the selected candidate word sequence is likely to contain the first disclosure statement in accordance with the one or more disclosure requirements.

11. The computer-implemented method of claim 1, wherein the compliance indicator is set to indicate that the branded content item is compliant with the one or more disclosure requirements in response to determining that an output of the natural language processing model is greater than a threshold compliance value.

12. The computer-implemented method of claim 1, further comprising transmitting the branded content item and the compliance indicator to a reviewing user prior to providing the branded content item on the media content platform.

13. The computer-implemented method of claim 12, further comprising determining whether to transmit the branded content item and the compliance indicator to the reviewing user based on a risk tolerance associated with the branded content item.

14. The computer-implemented method of claim 12, further comprising determining whether to transmit the branded content item and the compliance indicator to the reviewing user based on a confidence value associated with the compliance indicator.

15. The computer-implemented method of claim 1, further comprising inhibiting the branded content item from being published on the media content platform based on the compliance indicator indicating that the branded content item is non-compliant with the one or more disclosure requirements.

16. The computer-implemented method of claim 1, further comprising transmitting a notification to the user of the user device that recommends modifications to the branded content item based on the compliance indicator indicating that the branded content item is non-compliant with the one or more disclosure requirements.

17. The computer-implemented method of claim 1, further comprising determining that the speech portion of the branded content item is in a first language, wherein the speech portion is translated from the first language to a second language prior to generating the transcript of the speech portion of the branded content item.

18. A system for compliance checking content items, the system comprising:
   a memory; and
   a hardware processor that, when executing computer executable instructions stored in the memory, is configured to:
      receive, at a server from a user device associated with a user, a request to provide a branded content item on a media content platform;
      in response to receiving the request, transcribe an audio portion of the branded content item into a transcript of a speech portion of the branded content item;
      divide the transcript of the speech portion of the branded content item into a plurality of candidate word sequences having a particular number of words, wherein the plurality of candidate word sequences are obtained by advancing word-by-word in the transcript;
      select a candidate word sequence from the plurality of candidate word sequences based on a similarity that is determined by comparing each of the plurality of candidate word sequences with each of a plurality of target word sequences;
      in response to selecting the candidate word sequence, apply a natural language processing model to the selected candidate word sequence to determine whether the selected candidate word sequence contains a first disclosure statement in accordance with one or more disclosure requirements and applying the natural language processing model to a content description associated with the branded content item to determine whether the content description contains a second disclosure statement in accordance with the one or more disclosure requirements;
      associate the branded content item with a compliance indicator that indicates the branded content item is compliant with the one or more disclosure requirements in response to the natural language processing model indicating that the selected candidate word sequence contains the first disclosure statement and in response to the natural language processing model indicating that the content description contains the second disclosure statement; and
      automatically cause the branded content item to be published on the media content platform based on the compliance indicator indicating that the branded content item is compliant with the one or more disclosure requirements.

19. A non-transitory computer-readable medium containing computer executable instructions that, when executed by a processor, cause the processor to perform a method for compliance checking content items, the method comprising:
   receiving, at a server from a user device associated with a user, a request to provide a branded content item on a media content platform;
   in response to receiving the request, transcribing an audio portion of the branded content item into a transcript of a speech portion of the branded content item;
   dividing the transcript of the speech portion of the branded content item into a plurality of candidate word sequences having a particular number of words, wherein the plurality of candidate word sequences are obtained by advancing word-by-word in the transcript;
   selecting a candidate word sequence from the plurality of candidate word sequences based on a similarity that is determined by comparing each of the plurality of candidate word sequences with each of a plurality of target word sequences;
   in response to selecting the candidate word sequence, applying a natural language processing model to the selected candidate word sequence to determine whether the selected candidate word sequence contains a first disclosure statement in accordance with one or more disclosure requirements and applying the natural language processing model to a content description associated with the branded content item to determine whether the content description contains a second disclosure statement in accordance with the one or more disclosure requirements;
   associating the branded content item with a compliance indicator that indicates the branded content item is compliant with the one or more disclosure requirements in response to the natural language processing model indicating that the selected candidate word sequence contains the first disclosure statement and in response to the natural language processing model indicating that the content description contains the second disclosure statement; and
   automatically causing the branded content item to be published on the media content platform based on the compliance indicator indicating that the branded content item is compliant with the one or more disclosure requirements.

* * * * *